United States Patent [19]

Karlock

[11] Patent Number: 4,604,646
[45] Date of Patent: * Aug. 5, 1986

[54] VIDEO PROCESSING CIRCUIT

[76] Inventor: James A. Karlock, 3311 NE. 35th Ave., Portland, Oreg. 97212

[*] Notice: The portion of the term of this patent subsequent to Nov. 5, 2002 has been disclaimed.

[21] Appl. No.: 672,860

[22] Filed: Nov. 19, 1984

Related U.S. Application Data

[63] Continuation of Ser. No. 575,489, Feb. 1, 1984, abandoned, which is a continuation of Ser. No. 325,755, Nov. 30, 1981, abandoned.

[51] Int. Cl.⁴ .............................................. H04N 9/64
[52] U.S. Cl. ...................................... 358/28; 358/31; 358/37; 358/153
[58] Field of Search .............. 358/28, 31, 21 R, 21 V, 358/153, 27, 37, 139, 10; 307/350, 540, 546, 547, 549, 553, 557, 264; 328/168, 171, 172, 175

[56] References Cited

U.S. PATENT DOCUMENTS

| | | | |
|---|---|---|---|
| 4,110,699 | 8/1978 | Bethards | 307/547 |
| 4,153,911 | 5/1979 | Isono | 358/28 |
| 4,185,299 | 1/1980 | Harford | 358/153 |
| 4,254,435 | 3/1981 | Dayton | 358/153 |
| 4,276,560 | 6/1981 | Watanabe | 358/28 |
| 4,343,019 | 8/1982 | Lagoni | 358/31 |
| 4,504,851 | 3/1985 | Janko | 358/10 |
| 4,506,292 | 3/1985 | Newton | 358/10 |

Primary Examiner—Michael A. Masinick
Attorney, Agent, or Firm—Dellett, Smith-Hill and Bedell

[57] ABSTRACT

A video processing circuit separates chrominance and luminance signals and processes the same separately from synchronizing information whereby the video signal may be reformed with a selected video level, selected color saturation, and selected chroma hue. The synchronizing information is not reprocessed, but is coupled through the circuit and the other video signal portions are adjusted relative thereto.

27 Claims, 7 Drawing Figures

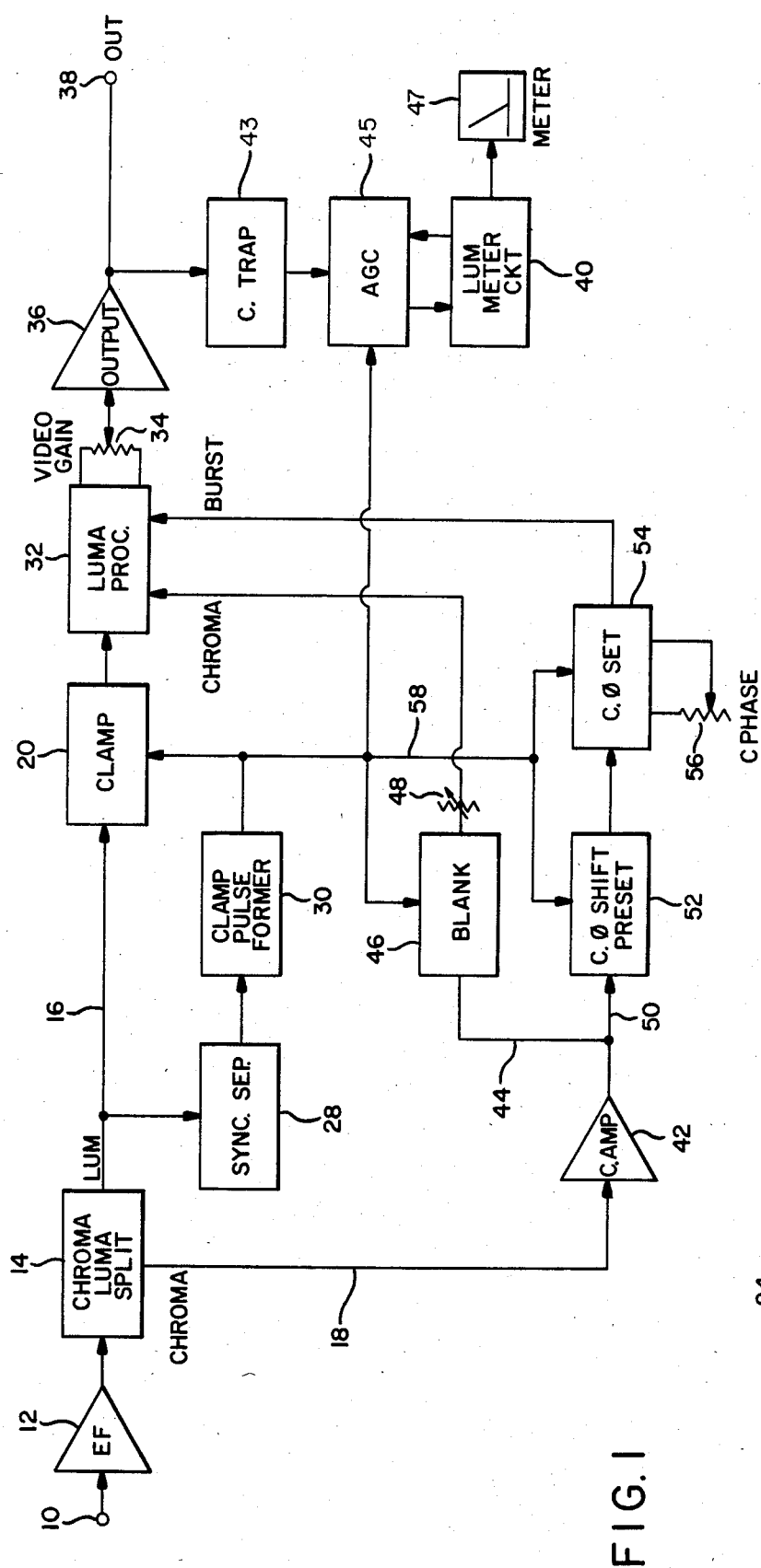

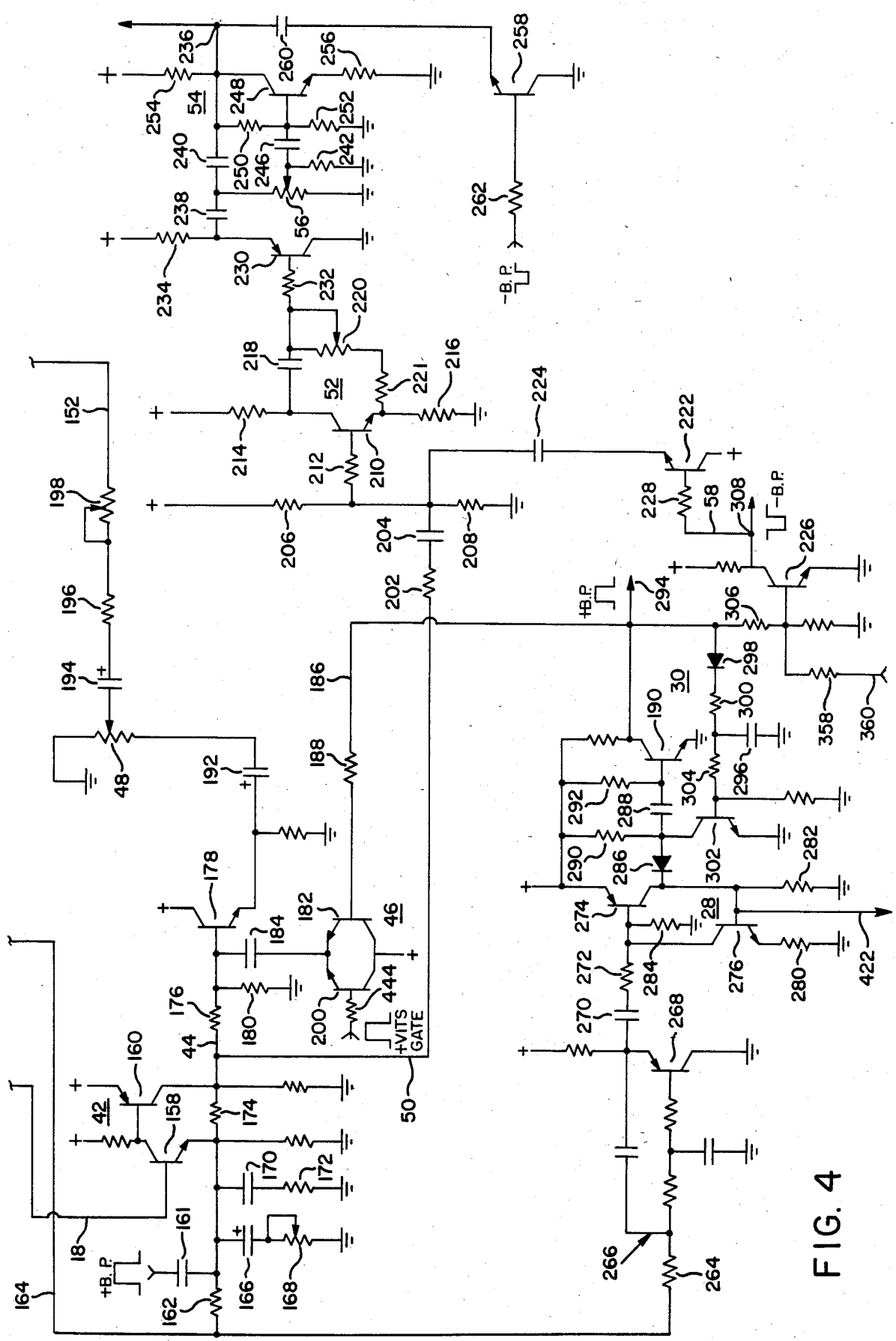

VIDEO PROCESSING CIRCUIT

This application is a continuation of application Ser. No. 575,489, filed Feb. 1, 1984, which was a continuation of application Ser. No. 325,755 filed Nov. 30, 1981, both now abandoned.

BACKGROUND OF THE INVENTION

The present invention relates to a video processing circuit for adjusting video luminance and chrominance levels as well as chroma hue, and particularly to such a circuit for selectively adjusting these factors relative to synchronizing information without reconstituting the latter.

It is frequently desirable to adjust the various components of a color video signal relative to one another, to suit individual preference or to compensate for misadjustment of other circuitry. Thus, one may wish to adjust the video output from video camera equipment, or adjust the input or output of a video recorder to improve transmission or recording capabilities as well as for improving picture quality. Although adjustments are usually available on television receiving or tuning equipment, alteration of the video signal may be desired between a tuner and hard-to-reach television projection equipment.

Heretofore, video processing circuitry of this type has often been expensive and designed primarily for the professional user. Usually the synchronization information, i.e. the horizontal and vertical synchronizing pulses, color burst, etc. are reformed or regenerated, while the video luminance and chrominance information is separately adjustable. Time delays are usually associated with the reconstituted sync and proper blanking in the video signal may be somewhat clumsy.

Unfortunately, the equipment heretofore provided for the professional market is not appropriate for adjusting signals of various levels from a wide variety of equipments as may be encountered by the consumer or home user of video apparatus. The professional equipment usually generates a synchronization pulse of predetermined amplitude and consequently the remainder of the video signal must be adjusted relative thereto.

SUMMARY OF THE INVENTION

In accordance with the present invention in a preferred embodiment thereof, a video processing circuit separates chrominance and luminance portions and the relative amplitudes of these portions are separately adjustable. The luminance portion, including synchronizing information, is clamped at the back porch level of the blanking pulse and sync separator means separate the luminance portion of the clamped video signal by providing a separate unilaterally conducting path for the sync information, leaving luminance information. The separated luminance portion is selectively amplified and provided to an output combining circuit, suitably comprising a potentiometer, receiving the output of the luminance amplifier and the output of the sync separator at one end terminal, and receiving only the output of the sync separator at the other end terminal. Thus the potentiometer or other combining device is adjustable between sync only, and a combination of sync and amplified luminance. The midpoint of such potentiometer provides sync and normal luminance, assuming the input to the circuit is properly constituted.

According to an embodiment of the invention, the separated chrominance signal is selectively amplified and the color burst is removed before combination with luminance in the aforementioned luminance amplifier. The color burst is separated from chrominance and is applied to the output of the aforementioned sync separator after phase-adjusting the color burst for desired hue.

In accordance with another feature of a preferred embodiment, an output metering circuit indicates video or luminance level relative to the synchronization information. An integrating circuit stores sync tip level and operates an automatic gain control circuit connected to the meter so that the meter indication is of video relative to sync. The automatic gain control circuit comprises a novel shunt transistor attenuation circuit. This type of metering is of value since various levels of video information can pass through the apparatus according to the present invention and be adjusted. One hundred percent luminance is arbitrarily selected to be some multiple of the sync tip level, and the user may adjust amplification means in the apparatus to bring up the video to a desired level relative to the synchronization information.

It will be observed that the synchronization information is not reconstituted, but rather the video signal is substantially readjusted relative to the synchronization. It has been found the circuitry according to the present invention provides optimal adjustment of the various video signal factors without requiring the expensive circuitry heretofore associated with reforming a video signal.

It is accordingly an object of the present invention to provide an improved video processing circuit.

It is another object of the present invention to provide an improved video processing circuit, which circuit is relatively uncomplicated and economical to produce.

It is another object of the present invention to provide an improved video processing circuit which can deal with video signals of various relative magnitudes without requiring either an input or an output at a predetermined amplitude level.

It is another object of the present invention to provide an improved video processing circuit having improved output metering means.

It is another object of the present invention to provide an improved video processing circuit having a metering circuit with an improved automatic gain control circuit.

It is another object of the present invention to provide an improved video processing circuit having improved circuitry for varying color burst phase.

The subject matter which I regard as my invention is particularly pointed out and distinctly claimed in the concluding portion of this specification. The invention, however, both as to organization and method of operation, together with further advantages and objects thereof, may best be understood by reference to the following drawings wherein like reference characters refer to like elements.

DRAWINGS

FIG. 1 is a block diagram of video processing circuitry according to the present invention, FIG. 2 is a simplified representation of a video signal waveform, FIG. 3 is a circuit diagram of a first portion of the FIG. 1 video processing circuit, particularly illustrating chrominance-luminance separation and luminance processing, FIG. 4 is a circuit diagram of a further portion of the FIG. 1 processor, particularly illustrating the chrominance channel, sync separation and processing, FIG. 5 is a circuit diagram of an output amplifier according to the video processing circuit of FIG. 1, FIG. 6 is a circuit diagram illustrating metering circuitry according to the video processing circuit of the present invention, and FIG. 7 is a circuit diagram illustrating vertical interval test signal control circuitry according to the present invention.

DETAILED DESCRIPTION

Figures 3, 5:
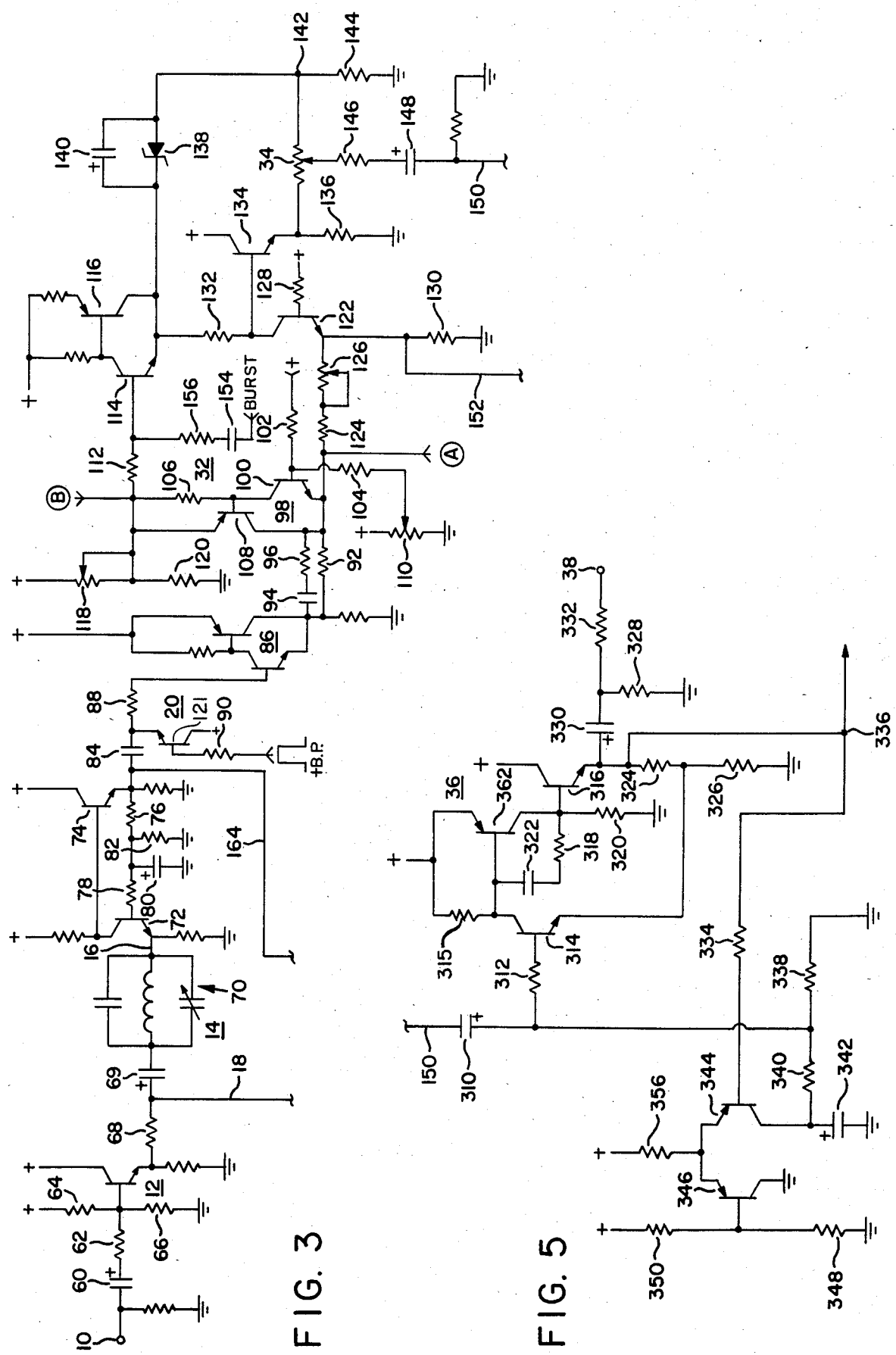

Referring to the drawings and particularly to FIG. 1, illustrating an embodiment of a video processing circuit according to the present invention in block diagram form, a video input signal, e.g. a color television video signal, is received at terminal 10 and coupled via emitter follower stage 12 to chrominance-luminance separation circuit 14 providing a first or luminance output 16, and a second or chrominance output 18. The luminance output is coupled to clamp circuit 20 which clamps the video signal at this point to the "back porch" of the video horizontal blanking pulse, this level being indicated at 22 in FIG. 2 which illustrates the video luminance signal in simplified form including video information or luminance information 24, and horizontal sync pulse 26. For the purposes of the present application, the sync pulse will be considered negative going, and the video positive going.

The clamping signal for clamping circuit 20 is derived via sync separator circuit 28, also receiving the luminance output of circuit 14, the sync separator circuit driving a clamp pulse former 30 providing a "back porch" pulse to clamp circuit 20 as well as to other portions of the overall circuit. The output of clamp circuit 20 is provided to a luminance processor 32 wherein the luminance information is separated from the synchronizing information or horizontal sync pulse, the luminance information is amplified to a desired or selected degree, and the amplified luminance information is recombined with the synchronizing information. The circuit 32 is configured, as hereinafter more fully described, such that output potentiometer 34 is adjustable between one extreme where substantially only synchronizing information is provided, and an opposite extreme wherein the combination of synchronizing information and amplified luminance information is provided. In the instance of a specific embodiment, the last mentioned extreme corresponds to double the normal video level (assuming the input signal is correctly constituted) such that midrange of potentiometer 34 selects a normal video level with normal sync. It will be understood, however, that normal sync is available anywhere along potentiometer 34.

The movable tap of potentiometer 34 is applied to an output circuit 36 driving output terminal 38 where the output information may be utilized for the intended purpose. The output of amplifier 36 is also applied to a metering circuit 40 via intervening chrominance trap 43 and automatic gain control circuit 45. Metering circuit 40 operates meter 47 such that the operator of the apparatus may select a desired video luminance level. The meter 47 is suitably calibrated in percent, i.e. from 0% of maximum luminance to 100% of maximum luminance. The circuit meters luminance relative to sync tip level, with 100% luminance being designated as a predetermined multiple of sync tip level. This means that if a television camera or other apparatus coupled to input terminal 10 of the overall circuit were to view a brightly illuminated white wall or the like, meter 47 should read approximately 100%. If the meter reads some other value, then the luminance should be adjusted accordingly by means of potentiometer 34. In any case, the metering is relative to the synchronization signal, and the overall circuit is not only applicable to a given level input or a given level output but can be utilized with a wide variety of equipments.

The output 18 from chrominance-luminance separation circuit 14 is also applied to a chrominance amplifier 42 the output of which is provided on lead 44 to a blanking circuit 46. Circuit 46 receives the output of clamp pulse former 30 for the purpose of removing the color burst from the chrominance signal. The output of the blanking circuit 46 is provided to the luminance processor 32 via level control 48 such that the amplitude of the chroma portion of the overall signal output of the circuit can be adjusted. As will be appreciated by those skilled in the art, adjustment of the chroma will affect the color saturation of the final output video signal. The adjusted chrominance component from control 48 is applied to an input to the luminance amplifier portion of processor 32 after separation of the synchronizing information from the luminance signal and before recombination with such synchronizing information.

The output on lead 50 from chrominance amplifier 42 is applied to a first phase-shifting circuit 52, the output of which is applied to a second phase-shifting circuit 54 having a control 56. The phase-shifting circuits 52 and 54 receive an output on lead 58 from pulse former 30 for the purpose of enabling only the color burst portion of the chrominance signal from amplifier 42. The output of phase-shifting circuit 54 comprises the phase-shifted color burst and is combined in processor 32 with the synchronizing information that has been separated from the luminance signal and before the synchronizing information is recombined with the combination of the luminance and chrominance signal portions. The first phase-shifting circuit 52, as hereinafter more fully described, is adapted to shift the phase of the color burst in a first direction, while second phase-shifting circuit 54 is adapted to shift the phase of the color burst in the opposite direction such that for center position of control 56, there would be no net shift of the color burst. However, control 56 can then be employed for shifting the color burst in either direction from its initial phase at the output 50 of amplifier 42. As will be appreciated by those skilled in the art, the phase-shifting of the color burst has the effect of controlling the "hue" of the resulting color picture.

Referring further to FIGS. 3–7 illustrating the circuitry according to the present invention in greater detail, a video signal received on input terminal 10, e.g. from a video camera, recorder, or the like, is coupled via capacitor 60 and resistor 62 in series to the base of the emitter follower transistor 12 which base is also disposed at the midpoint of a voltage divider comprising resistors 64 and 66 connected between a positive voltage and ground. The emitter of emitter follower transistor 12 is connected via resistor 68 and capacitor 69 in series to one end of a tuned circuit 70 tuned to the color subcarrier frequency and adapted to operate as the chrominance-luminance separator. The luminance signal will pass through the parallel tuned circuit to output 16 connected to the emitter of common base transistor stage 72. The chrominance output on lead 18 is derived from the midpoint between the resistor 68-capacitor 69 combination, and is therefore taken substantially across the parallel tuned circuit. The chrominance output on lead 18 is coupled to the chrominance amplifier 42 which will be further considered in connection with FIG. 4. Common base connected transistor 72 drives emitter follower transistor 74, the emitter of which is connected in feed-back fashion via resistors 76 and 78 to the base of transistor 72 for supplying the base voltage thereof. A capacitor 80, shunted by resistor 82, is interposed between the midpoint of resistor 76, 78 and ground.

Capacitor 84 couples the output of emitter follower transistor 74 to the base of compound transistor stage 86 by way of resistor 88. The junction between capacitor 84 and resistor 88 is connected to the emitter of clamping transistor 20 having its collector connected to a reference voltage, and having its base connected to clamping signal labeled +BP via resistor 90. The +BP input is a back porch clamp signal from pulse former 30 as hereinafter more fully described and clamps the back porch of the video signal at the emitter of transistor 20 at a predetermined level.

The output terminal of compound emitter follower stage 86 is coupled by way of resistor 92 shunted by capacitor 94 and resistor 96 in series to a sync separator stage 98, the latter comprising a transistor 100 having its emitter connected to the junction between resistors 92 and 96, its base connected to a reference voltage at the midpoint of a voltage divider comprising resistors 102 and 104, and its collector connected via resistor 106 to the emitter of transistor 108. The base of transistor 108 is connected to the collector of transistor 100, and the collector of transistor 108 is connected to the emitter of transistor 100. The stage operates as a common base stage, or more particularly as a unilateral conductor such that clipping takes place at the emitter of transistor 100. The voltage divider 102, 104 is connected between the same clamp reference voltage as at the collector of transistor 121, and a potentiometer 110, the latter being disposed between a positive voltage and ground. The potentiometer 110 is adapted to set the clipping level, but this clipping level is determined to be the back porch level of the video signal and, as a consequence, the synchronizing information comprising horizontal sync pulses is clipped at the emitter of transistor 100. However, the output of the circuit 98 provides a current at such time thereby coupling the synchronizing information through resistor 112 to the base of transistor 114, the latter forming part of a compound emitter follower with transistor 116. A voltage divider comprising a potentiometer 118 in series with the resistor 120 is disposed between a positive voltage and ground, with the junction between the emitter of transistor 108 and resistor 106 being connected to the midpoint of the voltage divider. The potentiometer 118 can be employed for setting the relative amplitude of the synchronization information, i.e. for setting a sync level as delivered to the base of transistor 114.

The emitter of transistor 100 is further coupled to an amplifier comprising common base transistor 122 by way of resistor 124 and potentiometer 126. The base of transistor 122 is returned to the same reference level as the collector of transistor 20 via resistor 128, its emitter is returned to ground by way of resistor 130, and its collector is connected to the emitter of transistor 114 through resistor 132. The collector of transistor 122 is also connected to the base of an emitter follower transistor 134 having an emitter resistor 136, the latter forming part of means for recombining or adjusting the luminance signal with respect to the synchronizing information. The emitter of transistor 114 is coupled via zener diode 138 shunted by by-pass capacitor 140 to terminal 142 of the output recombining or adjusting means, terminal 142 being returned to ground through resistor 144. The recombining or adjusting means suitably comprises a potentiometer 34 having one terminal connected to the emitter of transistor 134 and the remaining terminal connected to the aforementioned terminal 142.

It will be seen that the output of the amplifier comprising transistor 122 will be delivered via transistor 134 to the left end of the potentiometer, in conjunction with the synchronizing information supplied from the emitter of transistor 114 via resistor 132. The opposite end of potentiometer will be supplied with only synchronizing information from the emitter of transistor 114 via voltage dropping zener diode 138. Let us assume the amplifier comprising transistor 122 provides an amplification of two as compared with the input coupled to the overall circuit. Then movement of the movable tap of potentiometer 34 adjusts between a double level of luminance signal and zero level of luminance signal. However, the same level of synchronizing information is provided at both ends of the potentiometer. Consequently, the potentiometer 34 is used for adjusting luminance level with respect to the level of synchronizing information. It is noted that the synchronizing information is not reformed or regenerated, but luminance is adjusted with respect thereto. The movable tap of potentiometer 34 is coupled through resistor 146 and capacitor 148 to lead 150 connecting to output stage 36 as will hereinafter be more fully described.

As also hereinafter more fully described, the chrominance information is adjusted and is coupled on lead 152 to the emitter of amplifier transistor 122, the latter forming a summing point. Therefore, the luminance level potentiometer 34 may be considered an overall video level adjustment, having chrominance information returned thereto. Also, the burst is coupled to the base of transistor 114 through capacitor 154 in series with resistor 156, after the burst is adjusted in phase as will be hereinafter more fully described. Thus, the color burst is combined with synchronizing information including the sync pulses as delivered at both ends of potentiometer 34.

Referring to FIG. 4, the chrominance component of the video signal is coupled on lead 18 to chrominance amplifier 42 comprising transistor 158 and transistor 160 connected as a feedback pair where the gain is set by the feedback ratio. A back porch clamp is coupled to the emitter of transistor 158 through capacitor 161, and a resistor 162 couples the same emitter via lead 164 to the emitter of transistor 74 in FIG. 3. The latter connecton cancels some of the residual luminance that is found in the chrominance signal delivered from the chrominance-luminance separator circuit 14. The burst and chroma level at this point is adjusted by a circuit comprising capacitor 166 and variable resistor 168 disposed in series between the emitter of transistor 158 and ground. A high frequency compensation network comprising capacitor 170 in series with resistor 172 is also disposed between the emitter of transistor 158 and the ground. The emitter of transistor 158 is coupled to the collector of transistor 160 through resistor 174, and collector of transistor 160 is further connected via lead 44 to a blanking circuit 46, the purpose of which is to remove the color burst from the chroma information. Lead 44 is coupled via resistor 176 to the base of emitter follower transistor 178, the latter being returned to ground by base resistor 180. Clamping transistor 182, performing a blanking function, has its collector connected to a voltage reference level and its emitter coupled to the base of transistor 178 with capacitor 184. The base of transistor 182 receives a positive back porch clamp on lead 186 via resistor 188 from the collector of transistor 190 in pulse forming circuit 30. This back porch clamping pulse will effectively remove the color burst at the base of transistor 178 whereby the remaining chroma information at the emitter of transistor 178 is transmitted by way of capacitor 192 to one end of adjustment potentiometer 48 having its opposite terminal returned to ground. Potentiometer 48 is employed to set the chrominance level, i.e. the chrominance portion of the signal as amplified in the aforementioned amplifier 42, and the midpoint of the potentiometer is coupled through capacitor 194 in series with resistor 196 and variable resistor 198 to lead 152 for connection to the emitter of luminance amplifier transistor 122 in FIG. 3. In shunt with transistor 182 is a second transistor 200 comprising a VITS gate, the purpuse which will be hereinafter more fully described.

Lead 50 from chrominance amplifier 42 is coupled through resistor 202 and capacitor 204 in series to the midpoint of a voltage divider 206, 208 disposed between a positive voltage and ground, the midpoint of such voltage divider being further coupled to the base of transistor 210 in phase-shift stage 52 by way of resistor 212. Transistor 210 has its collector returned to a positive voltage through resistor 214, and its emitter returned to ground via resistor 216. A capacitor 218 connects the collector of transistor 210 to a first end of potentiometer 220, while a resistor 221 is interposed between the emitter of transistor 210 and the opposite end of potentiometer 220.

A clamping transistor 222 has its collector returned to a positive voltage and its emitter coupled to the midpoint of the voltage divider 206, 208 with a capacitor 224, while the base of transistor 222 is connected to the collector of transistor 226 by way of coupling resistor 228, wherein the transistor 226 provides a negative BP (back porch) clamp. As a result, the color burst is enabled at the base of transistor 210, but the chroma information is disabled.

The potentiometer 220 is employed to provide an adjustable chroma phase preset, in particular reference to the color burst. As hereinbefore described, the circuit 52 is adapted to adjust the phase of the color burst in a first direction, while the following stage 54 is adapted to adjust the phase in the opposite direction. Stage 52 provides a preset so that stage 54 can cancel out the effect of stage 52, and/or provide a positive or negative phase shift of the color burst as compared with the color burst of the original input signal. The movable tap of potentiometer 220 is connected to the base of transistor 230 via coupling resistor 232, wherein transistor 230 is connected as a emitter follower and drives the circuit 54. The emitter of transistor 230 is returned to a positive voltage through resistor 234, and is coupled to output burst terminal 236 through capacitors 238 and 240 in series. Potentiometer 56, providing the color burst phase control, is interposed between the midpoint of capacitors 238, 240, and ground, while the movable tap of the potentiometer 56 is returned to ground by means of a linearizing resistor 242. Capacitor 246 couples the movable tap of potentiometer 56 to the base of transistor 248 which is also connected to the midpoint of a voltage divider comprising resistors 250, 252 disposed between the collector of transistor 248 and ground. A resistor 254 connects the collector of transistor 248 to a positive voltage and the emitter of transistor 248 is returned to ground by way of resistor 256.

The phase-shift circuit 54 has the advantage of substantially linear control of the chroma or color burst phase-shift relative to rotation of the control of potentiometer 56. The linearizing resistor 242 is connected between movable tap of the potentiometer and ground in this circuit, whereas such a linearizing resistor could not be positioned at this point should the control potentiometer 56 be located in the emitter circuit of the transistor, for example. Resistor 242 is readily selected in accordance with the value of potentiometer 56 so that a linearizing effect is achieved. In a particular circuit, the value of potentiometer 56 was 2K whereas the value of resistor 242 was 1K, but it is understood that this is only by way of example. It will be understood that burst information is phase-shifted through the transistor 248, with potentiometer 56 being used to adjust desired phase between extremes. The adjusted color burst information from terminal 236 is coupled through capacitor 154 to circuit 32 in FIG. 3. The burst is further enabled by a transistor 258 having its collector grounded, its emitter connected to terminal 236 through capacitor 260, and its base coupled to the negative back porch clamping signal through resistor 262.

Lead 164 from the emitter of transistor 74 in FIG. 3 is further connected to a sync separator circuit 28 through resistor 264 and low pass filter 266, the purpose of which is to remove "snow" or other interference from the video signal. Transistor 268 at the output of the filter drives the sync separator circuit 28 including a capacitor 270 in series with a resistor 272 interposed between the emitter of transistor 268 and the base of transistor 274. Transistor 274 has its emitter connected to a positive voltage, and its collector returned to ground through resistor 282 as well as being connected to the base of transistor 276. The collector of transistor 276 is connected to the base of transistor 274 while the emitter of transistor 276 is returned to ground through resistor 280. A resistor 284 is interposed between the base of transistor 282 and ground.

Transistor 276 is a positive feedback stage that operates during sync pulses. Because of the added feedback stage, the size of capacitor 270 and resistor 284 may be comparatively large and the circuit will still recover from vertical rate tilt, and no "sag" is produced in the signal detected from one line to the next. Consequently, the horizontal sync pulses are consistently detected approximately midrange and the circuit will produce reliable sync information without undue expense and complexity. It is noted that the circuit is desirably driven by a low impedence source, i.e. from the emitter of transistor 268 which is effective in pulling the sync separator out of a saturated condition it achieves during horizontal sync pulses. In the particular embodiment, capacitor 270 had the value of 0.01 microfarads, resistor 272 had a value of 56 ohms, and resistor 284 had a value of 1 megohm, it being understood these values are given by way of example only. The circuit is advantageously employed in the present system wherein a considerable amount of timing information is required to operate the various clamps and DC restoring circuits in accurately predetermined relation to horizontal sync pulses. The collector of transistor of 274 is connected to a narrow-pulse eliminator circuit which includes a diode 286, its cathode being connected to the collector of transistor 274 and its anode being coupled via capacitor 288 to the base of transistor 190. The junction between the diode 286 and capacitor 288 and the junction between the capacitor 288 and the base of transistor 190 are respectively returned to a positive voltage through resistors 290 and 292. When sync pulses occur, the cathode of diode 286 goes positive and the anode of the diode drifts positive as it charges capacitor 288. If the pulse ends early, that is capacitor does not have enough charge on it to trigger the transistor 190, the pulse doesn't operate the circuit. The transistor 190 forms a half-multivibrator that is triggered on the trailing edge of the sync pulse. It will not be triggered unless a sync pulse has been present for a proper length of time. The output of transistor 190 at terminal 294 comprises the positive BP (back porch) clamp which is applied to blanking circuit 46 to remove the burst from the chrominance signal information and to other portions of the circuit as indicated. The clamp pulse output on terminal 294 is also employed to charge up capacitor 296 through diode 298 and resistor 300. The charge on capacitor 296 operates transistor 302 by way of resistor 304 wherein the collector of transistor 302 is connected to the anode of diode 286. Consequently, subsequent to the clamp pulse at 294 being on, a lock-out gate is formed so that after a legitimate sync pulse is detected, the circuit will not accept another input pulse for a significant period of time. Therefore, triggering upon noise is further inhibited. In general, the postive pulse at terminal 294 is used for DC restoration and burst removal, and the negative version of the pulse is used for burst enablement and chroma removal. As will be seen, the terminal 294 is coupled to inverting transistor 226 via resistor 306 for generation of the negative BP clamp at terminal 308.

Referring now to FIG. 5, depicting the output amplifier 36, the input on lead 150 coupled from the luminance level potentiometer 34 is passed through capacitor 310 and resistor 312 to transistor 314 which is part of a compound stage with transistor 362 having its base connected to the collector of transistor 314. The collector of transistor 362 is returned to ground via resistor 320, while the series circuit of a resistor 318 and a capacitor 322 is disposed between the collector and base of transistor 362 for improving high frequency stability. The collector of transistor 362 is connected to the base of an emitter follower transistor 316 having its emitter returned to ground through the series connection of resistors 324 and 326. The center tap between resistors 324 and 326 connects to the emitter of transistor 314. The collector of transistor 314 is connected to a positive voltage through resistor 315. The circuit constants of output stage 36 are chosen to provide a gain of two in the particular embodiment described.

The emitter of transistor 316 is coupled through capacitor 330 and resistor 332 in series to output terminal 38 for the overall circuit. Only one output terminal is shown, but is understood plural output terminals would ordinarily be driven through resistors similar to resistor 332. Also connected to the emitter of transistor 316 is resistor 334 coupling the same to the base of a transistor 344 having its emitter connected to a positive voltage and its collector returned to ground via capacitor 342. A transistor 346 has its base connected to the midpoint of a voltage divider 348, 350 disposed between a positive voltage and ground, and its emitter connected to the emitter of transistor 344 to provide a voltage reference. Resistors 338 and 340 are disposed in series between the collector of transistor 344 and ground, and the midpoint therebetween is connected to the junction between capacitor 310 and resistor 312.

The circuit including transistor 344 comprises a DC restoring circuit for clamping the sync tips of the output at a predetermined voltage, which was 3.4 volts in the specific embodiment. When the output tends to go negative, transistor 344 conducts, thereby charging capacitor 342. Capacitor 342 is coupled to the base of transistor 314 by way of resistor 340 and functions to DC restore the input signal. The charge on the capacitor is bled off by the shunt resistor arrangement including resistors 338 and 340.

Emitter follower transistor 316 provides greater output drive enabling the circuit to drive a plurality of outputs simultaneously. Emitter follower transistor 316 has a fairly high beta at high currents, and the amount of loop gain in the negative feedback circuit including resistor 324 provides an output circuit with very low distortion, e.g. in the case of a color signal. The stage is very stable and the distortion specification does not change with average picture level. Tapping the emitter of transistor 314 on the voltage divider 324, 326 allows the enhancement of the loop gain. In the circuit, the values of resistors 315 and 326 in part establish the loop gain setting.

Figure 6:
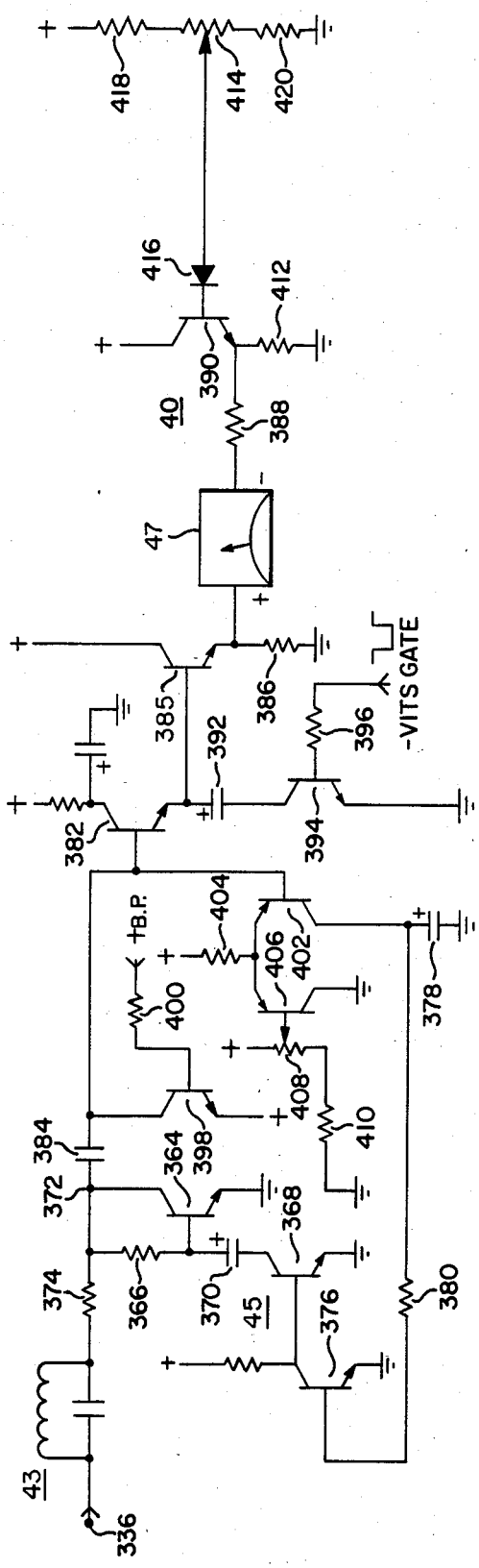

Referring now to FIG. 6, illustrating output metering circuitry according to the present invention, terminal 336, corresponding to the similarly numbered terminal in FIG. 5, is coupled to an AGC or automatic gain control circuit by way of chrominance signal trap 43 which is adapted to filter out the chrominance portion of the output signal. The circuit includes a shunt transistor 364 having a resistor 366 positioned between the collector and base thereof, while the emitter of transistor 364 is grounded. The transistor 364 consequently operates as a resistance. A second transistor, numbered 368 has its emitter connected to ground and its collector coupled to the base of transistor 364 by capacitor 370 and functions to control the shunt resistance represented by transistor 364. Consequently, a variable attenuation circuit is positioned between a terminal 372, coupled to the output of filter 43 via resistor 374, and ground. The circuit comprising transistor 368 establishes the attenuation at a comparatively low voltage level, and coupled with transistor 364 provides a controlled resistance capable of operating at a substantial voltage level.

Transistor 368 has its base connected to the collector of amplifying transistor 376, the emitter of which is grounded, and the base of which is coupled across a capacitor 378 by way of resistor 380. It is the level on this capacitor which drives the variable resistance circuit comprising transistors 364 and 368 via amplifying transistor 376. The charge across capacitor 378 is developed in response to the input signal as hereinafter more fully described.

Terminal 372 is coupled to base of peak detector transistor 382 by way of capacitor 384, and transistor 382 in turn drives the base of emitter follower transistor 385. The emitter of transistor 385 is returned to ground through resistor 386, and also provides one terminal for meter 47, the meter being coupled in series with resistor 388 to the emitter of a meter zeroing emitter follower transistor 390. The emitter of transistor 382 is coupled through capacitor 392 to the collector of transistor 394 driven at its base through resistor 396 from the VITS signal as hereinafter more fully described.

The base of transistor 382 is also connected to a clamping circuit comprising transistor 398 having its collector connected to the base of transistor 382, its emitter returned to a reference voltage, and its base coupled to the +BP clamp by way of resistor 400. In the specific embodiment, the transistor 398 clamps the back porch of the video signal at 3.0 volts. Generally, in the specific embodiment, the tips of the horizontal sync pulses extend down to 2.7 volts. The level to which the sync tips extend downwardly below the clamping level at the base of transistor 382 determines operation of the automatic gain control. Capacitor 378 is charged up during the time corresponding to the horizontal sync pulses by way of transistor 402 having its base connected to the base of transistor 382, its collector connected to capacitor 378, and its emitter returned to a positive voltage via resistor 404. Transistor 402 forms a balanced amplifier with a transistor 406, the latter having its emitter connected to the emitter of transistor 402, its collector grounded, and its base connected to the movable tap of a potentiometer disposed between a positive voltage reference and a resistor 410 returned to ground. The potentiometer 408 is employed as a meter calibrating adjustment. The transistor 402 is turned on to charge capacitor 378 only during the very bottom of the sync tips. The voltage across capacitor 378 is adjusted by means of potentiometer 408 so that the desired level of attenuation is achieved with transistors 364, 368, and a desired level of video signal appears at the base of transistor 382. It will thus be seen that the circuit adjusts to provide a predetermined sync tip level and then the meter will read the general level of the video signal above the back porch clamping level as integrated by means of capacitor 392.

The meter zeroing circuit including transistor 390 is employed to provide a voltage for causing a zero reading of meter 47 for substantially zero luminance, i.e. when the lens of a video camera is capped or the like. The collector of transistor 390 is connected to a positive voltage, its emitter is returned to ground through resistor 412, and its base is connected to the movable tap of potentiometer 414 by way of diode 416 having its cathode connected to the transistor base. The potentiometer 414 is disposed between a resistor 418 which connects one end of the potentiometer to a positive voltage, and a resistor 420 which connects the opposite end of the potentiometer to ground.

Figure 7:
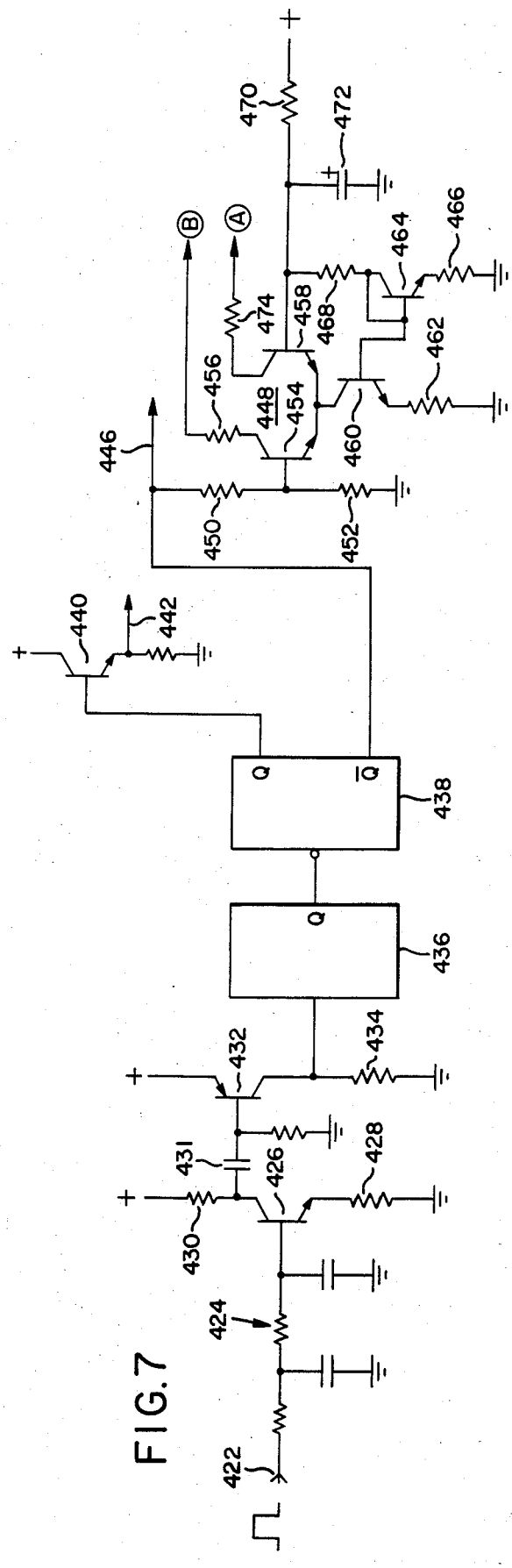

Referring to FIG. 7, circuitry is illustrated for developing a VITS or vertical interval test signal gate for application in various other parts of the circuitry. The purpose of this VITS circuitry is to let any vertical interval test signals, that might appear on the input, pass through unchanged. Processing by the present circuitry is disabled during the time that VITS might appear. In FIG. 7, the input on lead 422 is derived from sync stripper circuit 28 in FIG. 4, and particularly from the connection between the collector of transistor 274 and the base of transistor 276. This lead is connected to the input of a vertical integrating network 424 in FIG. 7 having its output connected to the base of an amplifier transistor 426, the latter having its emitter returned to ground by resistor 428 and its collector connected to a positive voltage through resistor 430. The amplifier comprising transistor 426 is inverting and consequently a negative going vertical sync pulse appears at the collector of transistor 426 and is coupled via capacitor 431 to the base of transistor 432. The circuitry including transistors 426 and 432 operates as a vertical sync separator and squares up vertical sync pulses supplying an output across resistor 434 interposed between the collector of transistor 432 and ground. The output of transistor 432, which is positive going, triggers one-shot multivibrator 436, the latter comprising one-half of a type 74C221 integrated circuit. The Q output of one-shot multivibrator 436 is coupled to the inverting input of multivibrator 438, the latter also comprising one-half of a type 74C221 integrated circuit. The one-shot multivibrator 436 delays the time between the vertical sync pulse and the start of the area where VITS may be found in the video signal. Then, circuit 438 is triggered to provide a proper width pulse for operating the various VITS gates. The Q output of circuit 438 is applied by way of emitter follower transistor 440 to provide a positive output at 442 used for driving various clamps. For example, one such clamp is located in the chrominance circuit in FIG. 4 and comprises transistor 200 which is driven by way of resistor 444. This same signal is also applied to the base of transistor 226 through resistor 358 from terminal 360 in FIG. 4.

The $\overline{Q}$ output of circuit 438, labeled 446, is applied to circuits requiring a negative VITS gate, e.g. transistor 394 in FIG. 6 for disabling the metering circuit, and also to a circuit 448 for providing a balanced output for driving points A and B in FIG. 3. Lead 446 is connected to one end of a voltage divider comprising resistors 450 and 452 disposed in that order to ground and having the base of transistor 454 connected to the midpoint thereof. The collector of transistor 454 is coupled to terminal B through resistor 456, and the emitter of transistor 454 is connected to the emitter of transistor 458 which forms a balanced amplifier or switched current source with transistor 454. The emitters of the two transistors are connected in common to the collector of current source transistor 460 having its emitter grounded through resistor 462 and its collector connected to diode connected transistor 464 providing a reference. The emitter of transistor 464 is returned to ground via resistor 466 and its collector is connected to a positive voltage by way of resistors 468 and 470 in series. The center tap between resistors 468 and 470 is also connected to the base of transistor 458, and a filter capacitor 472 is disposed between the base of transistor 458 and ground. A resistor 474 connects the collector of transistor 458 to output A.

As will be noted in FIG. 3, terminals A and B are connected respectively to the emitter of transistor 100 and the emitter of transistor 108. During the VITS interval, the current supplied via terminal A will keep the sync separator transistors 100 and 108 turned on. All of the signal including both luminance and synchronizing information will be coupled at this time through the sync separator 98, through resistor 112 and the circuit including transistors 114 and 116 to both sides of potentiometer 34. Thus, during the VITS interval, the overall video signal will be uneffected by luminance processor circuit 32 and consequently the VITS information will pass through without alteration. At other times, the current which is provided at terminal B rather than at terminal A, maintains the same current level through potentiometer 118, for example.

During the VITS interval, the chrominance channel is substantially disabled since the blanking circuit 46 is kept on. The chrominance information is enabled through the color burst phase adjusting channel at this time since a VITS gate signal is applied at terminal 360 so as to continuously enable circuits 52 and 54. The chrominance information is delivered to processor circuit 32 along with burst at capacitor 154 in FIG. 3. Therefore, chrominance adjustment will not interfere with passing of the VITS information.

While I have shown and described preferred embodiments of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. A processing circuit for processing a color video signal comprising:
   an input circuit path for receiving a video input signal,
   means for removing the chrominance signal portion from said video signal,
   means for clamping the video signal with the chrominance signal portion removed to a predetermined back porch clamping level of said video signal,
   means for separating the luminance signal portion of the clamped video signal comprising a unilaterally conducting sync separator circuit for conducting at levels below the back porch clamping level whereby synchronizing signals are coupled through said sync separator circuit and substantially eliminated from the luminance signal portion at the input of the sync separator circuit,
   means for amplifying the separated luminance signal portion from the input of the sync separator circuit,
   and means for selectively recombining the amplified luminance signal portion with said synchronizing signals coupled through said sync separator circuit to provide an output signal.

2. The apparatus according to claim 1 further including means for selectively amplifying the removed chrominance signal portion and recombining the same with the separated luminance signal portion before amplification thereof,
   means for separating the color burst from said removed chrominance signal portion,
   and means for changing the phase of said color burst and recombining the same with said synchronizing signals prior to recombination of said synchronizing signals with amplified luminance and chrominance signal portions.

3. The apparatus according to claim 1 wherein said means for recombining includes adjustable control means having first and second input end terminals, said adjustable control means receiving amplified video information from said amplifying means as well as the output of said sync separator circuit at one input end terminal thereof, and receiving the output of said sync separator circuit at the other input end terminal thereof, whereby adjustment is made between extremes of synchronization information and the combination of synchronization information with amplified video information.

4. The apparatus according to claim 3 wherein said means for recombining comprises a potentiometer.

5. The apparatus according to claim 2 wherein said means for changing the phase of said color burst comprises first phase-shifting means for shifting the phase of said color burst in a first direction,
   second phase-shifting means for receiving the output of said first phase-shifting means and for shifting the phase of said color burst in a second direction,
   a said phase-shifting means receiving a blanking signal corresponding to the time period of the color burst for removing the chrominance signal portion while enabling the color burst,
   and control means for adjusting the phase shift of said second phase-shift means,
   the output of said second phase-shift means being coupled with said synchronizing signals after removal of the luminance signal portion therefrom.

6. The apparatus according to claim 1 further including a metering circuit for ascertaining the relative level of said output signal, said metering circuit comprising:
   an automatic gain control circuit for receiving said output signal and selectively attenuating the same to provide a gain-controlled output,
   means for detecting the level of synchronizing signals in said output signal and operating said automatic gain control circuit in accordance therewith,
   and meter means for indicating the level of said gain-controlled output from said automatic gain control circuit.

7. The apparatus according to claim 6 wherein said automatic gain control circuit comprises a first transistor having its collector-emitter path disposed in shunt relation with said output signal and a resistor coupled between the collector of said transistor and the base of said transistor,
   and a second transistor having its collector capacitively coupled to the base of said first transistor, the base of said second transistor receiving an input proportional to the level of said synchronizing signals.

8. The apparatus according to claim 7 further including clamping means for clamping said gain-controlled output at a predetermined level and means for integrating the level of horizontal synchronizing pulses for controlling the level of operation of said automatic gain control circuit.

9. The apparatus according to claim 5 wherein one of said phase-shifting means comprises a transistor circuit comprising an input terminal, a transistor, and a first capacitor coupled between said input terminal and the collector of said transistor, the latter providing an output terminal,
   an input potentiometer disposed between said input terminal and a point of reference potential,
   a capacitor coupling the movable tap of said potentiometer to the base of said transistor,
   and a linearizing resistor coupled between the movable tap of said potentiometer and the point of reference potential.

10. A processing circuit for processing video information comprising:
    an input terminal for receiving a video input signal,
    means for clamping the back porch of blanking pulses of said video signal to a predetermined level,
    means coupled to the output of said means for clamping comprising a sync separator circuit including unilaterally conducting means for conducting at levels below said back porch whereby synchronizing information is coupled through said unilaterally conducting means, amplifier means also coupled to receive the output from said means for clamping with said synchronizing information substantially removed therefrom by said sync separator circuit, and an output device receiving the output of said amplifier means and receiving an output through said unilaterally conducting means for providing a range of combined output between the output via said unilaterally conducting means on the one hand and the combined output of said unilaterally conducting means and said amplifier means on the other hand.

11. The apparatus according to claim 10 wherein said amplifier means comprises a transistor providing an output at its collector, said apparatus further comprising an emitter follower transistor means having a base terminal connected to receive the output through said unilaterally conducting means and having an emitter terminal coupled to the collector of the amplifier means transistor, means for coupling the collector of the amplifier means transistor to one terminal of said output device, and means for coupling the emitter terminal of said emitter follower transistor means to a second terminal of said output device, said output device comprising a potentiometer.

12. The apparatus according to claim 11 wherein said means coupling the collector of said amplifier means transistor to one terminal of said output device comprises an emitter follower transistor, and wherein the means coupling the emitter of said emitter follower transistor means to the second terminal of said output device comprises a zener diode.

13. The apparatus according to claim 12 wherein said unilaterally conducting means comprising a transistor having its emitter connected to receive the output of said means for clamping, its base connected to the clamping level of said means for clamping, and its collector coupled to the base of said emitter follower transistor means.

14. The apparatus according to claim 11 wherein the emitter terminal of said emitter follower transistor means is resistively coupled to the collector of said amplifier means transistor.

15. A processing circuit for processing a color video signal comprising:

an input circuit path for receiving a video input signal, means for removing the chrominance signal portion from said video input signal, means for setting the voltage level of said video signal after removal of said chrominance signal portion so that the video signal back porch is proximate a predetermined reference level about which said video signal varies, means for separating the luminance signal portion of the video signal comprising a unilaterally conducting sync separator circuit for conducting at levels in a given polarity direction relative to said predetermined reference level whereby synchronizing signals are shunted through said sync separator circuit and substantially eliminated from the luminance signal portion at the input of the sync separator circuit while the luminance signal is retained for further processing, and means for coupling the thus separated luminance signal portion from the input of the sync separator circuit.

16. The apparatus according to claim 15 further including means for selectively amplifying the removed chrominance signal portion and recombining the same with the separated luminance signal portion.

17. The apparatus according to claim 16 further including means for recombining the luminance signal portion with said synchronizing signals as shunted through said sync separator circuit, means for separating the color burst from said removed chrominance signal portion prior to recombination thereof with said luminance signal portion, and means for changing the phase of said separated color burst and recombining the same with said synchronizing signals prior to recombination of said synchronizing signals with said luminance signal portion, wherein said means for changing the phase of said color burst comprises first phase-shifting means for shifting the phase of said color burst in a first direction, second phase-shifting means for receiving the output of said first phase-shifting means and for shifting the phase of said color burst in a second direction, and control means for adjusting the phase shift of one of said phase-shifting means, the output of said second phase-shifting means being coupled with said synchronzing signals.

18. The apparatus according to claim 15 including means for amplifying the separated luminance signal portion, and means for selectively recombining the amplified luminance signal portion with said synchronizing signals as shunted through said sync separator circuit.

19. The apparatus according to claim 18 including means for separating the color burst from said removed chrominance signal portion, and means for changing the phase of said color burst and recombining the same with said sychronizing signals prior to recombination of said synchronizing signals with said amplified luminance signal portion.

20. The apparatus according to claim 15 further including means for recombining the luminance signal portion with said synchronizing signals, said means for recombining comprising adjustable control means having first and second input terminals, said adjustable control means receiving both the separated luminance signal portion and the synchronizing signals from said sync separator circuit at one input end terminal thereof, and receiving the synchronizing signals from said sync separator circuit at the other input end terminal thereof, whereby adjustment is made between extremes of synchronization information and the combination of synchronization information with video information.

21. The apparatus according to claim 20 wherein said means for recombining comprises a potentiometer.

22. The apparatus according to claim 15 wherein said means for removing the chrominance signal portion from said video input signal comprises a parallel tuned circuit substantially tuned to the color subcarrier frequency, the chrominance signal portion being developed across said tuned circuit and the remainder of the video signal being derived in series with said tuned circuit.

23. A metering circuit for ascertaining the level of a video signal comprising:
   an automatic gain control circuit for receiving said video signal and selectively attenuating the same to provide a gain-controlled output,
   means for detecting the level of synchronizing signals in said video signal and operating said automatic gain control circuit to provide selective attenuation in accordance with the level of synchronizing signals,
   and means for indicating the level of said gain-controlled output from said automatic gain control circuit.

24. The apparatus according to claim 23 wherein said automatic gain control circuit comprises a first transistor having its collector-emitter path disposed in shunt relation with said output signal and a resistor coupled between the collector of said transistor and the base of said transistor,
   and a second transistor having its collector capacitively coupled to the base of said first transistor, the base of said second transistor receiving an input proportional to the level of said synchronizing signals.

25. A circuit for establishing a voltage-dependent resistance between a first conductor and a second conductor, said circuit comprising:
   a first transistor having its collector-emitter path coupled between said first conductor and said second conductor,
   a resistor coupled between the collector of said first transistor and the base of said first transistor,
   and a second transistor having its collector capacitively coupled to the base of said first transistor, the base of said second transistor receiving a control input for controlling the voltage at the collector of the second transistor and thereby controlling the resistance between the first conductor and the second conductor.

26. A circuit according to claim 25, being an automatic gain control circuit and wherein the first conductor is a signal input conductor and the second conductor is coupled to a reference potential level.

27. A circuit according to claim 26, comprising a first capacitor and having one side coupled to the signal input conductor and its opposite side coupled to the collector of a clamping transistor, for intermittently clamping said opposite side of the first capacitor to a selected potential level, a second capacitor having one side coupled to said reference potential level and having its opposite side coupled to the base of said second transistor, and a third transistor having its base coupled to said opposite side of the first capacitor and having its collector-emitter path coupled between said opposite side of the second capacitor and a second reference potential level for charging the second capacitor to a voltage dependent on the voltage at said opposite side of the first capacitor.

* * * * *